United States Patent Office 3,446,057
Patented May 27, 1969

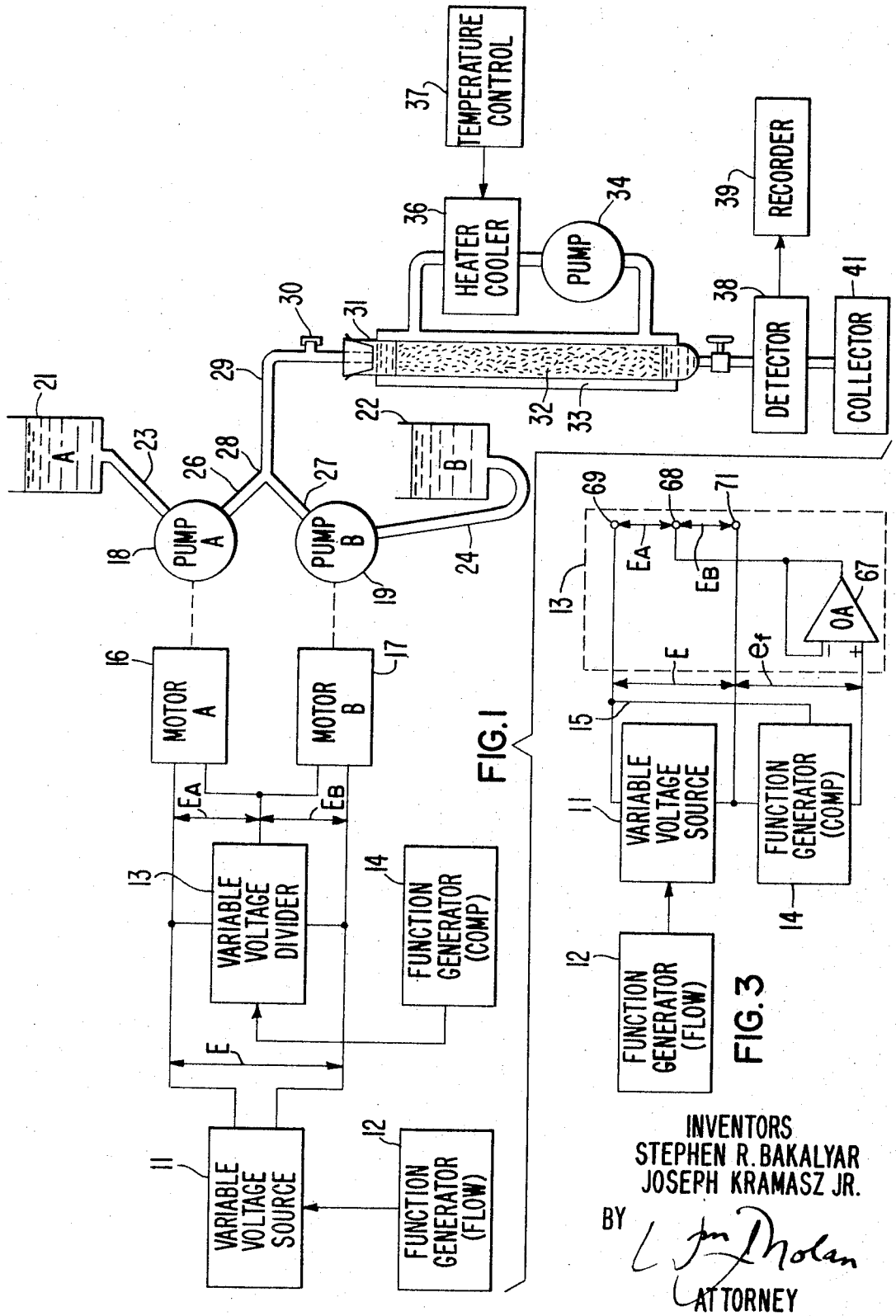

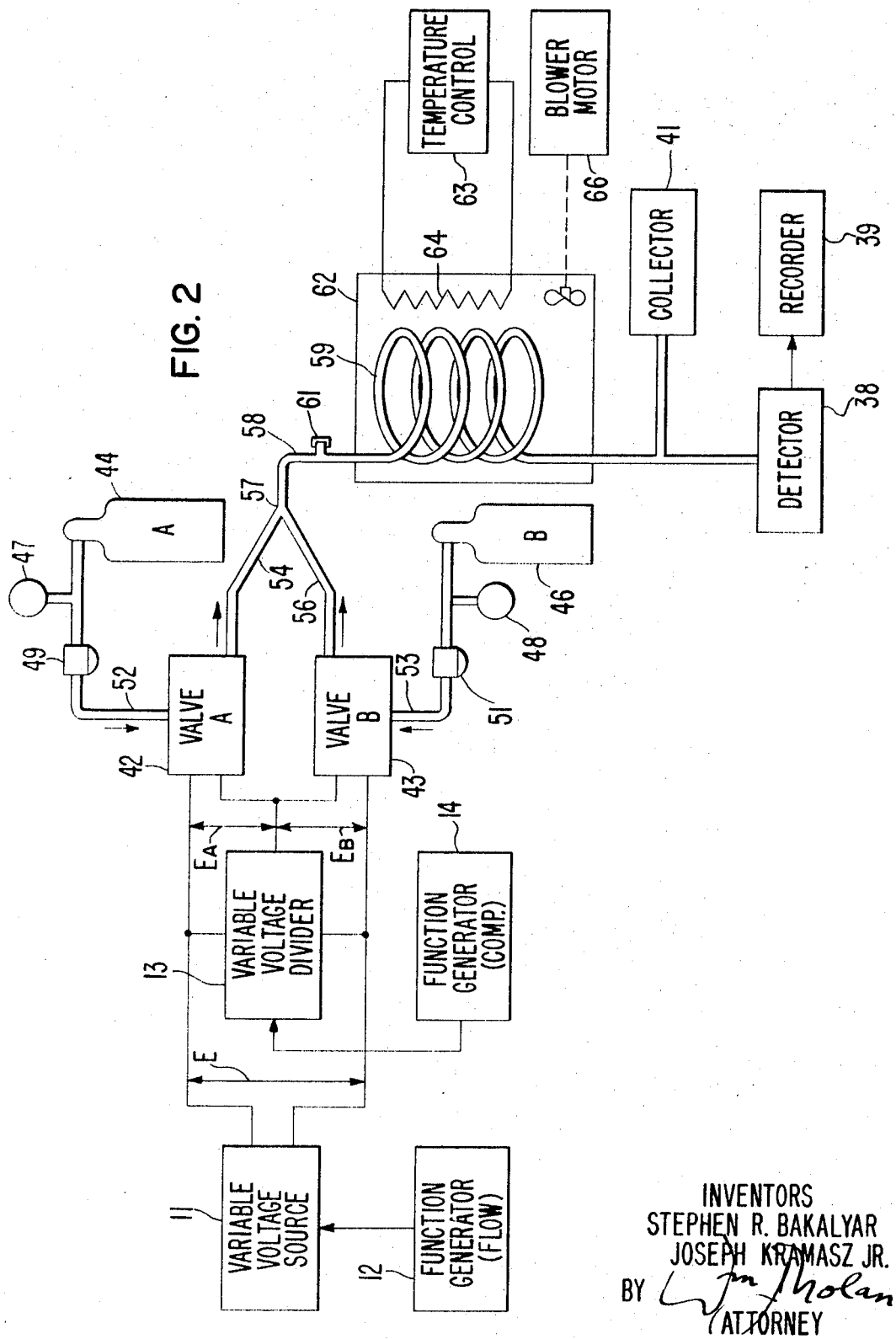

3,446,057
METHOD AND APPARATUS FOR
CHROMATOGRAPHY
Stephen R. Bakalyar, Berkeley, and Joseph Kramasz, Jr.,
Concord, Calif., assignors to Varian Associates, Palo
Alto, Calif., a corporation of California
Filed Oct. 14, 1966, Ser. No. 586,773
Int. Cl. G01n 31/08
U.S. Cl. 73—23.1                                                19 Claims

ABSTRACT OF THE DISCLOSURE

A method and apparatus usable as a chromatographic system which provides for simultaneously, independently, and automatically varying the flow rate and chemical composition of the mobile phase in accordance with preselected function of time. The mobile phases to be mixed are stored in reservoirs having individual flow controllers operated by signals from a voltage divider network. The voltage applied to the divider determines the flow rate of the mobile phase while the voltage ratios determine its composition. Programming means vary both the voltage applied to the divider and the divider ratios according to preselected functions of time.

---

This invention relates to chromatography and, in particular, to a method and apparatus wherein the flow rate and chemical composition of the mobile phase in a chromatographic system may be simultaneously, independently, and automatically varied as preselected functions of time.

Chromatography is a separation method wherein a mixture of components (called the "sample" or "sample mixture") is placed as a zone at one end of a system containing a stationary phase and a mobile phase. Each component of the sample distributes itself in dynamic equilibrium between the two phases in a ratio characteristic of that component. As a result, the flowing mobile phase causes each individual component zone to migrate at a characteristic rate, and the zones become separated after a period of time. There are various types of chromatography, e.g., liquid chromatography, gas chromatography, thin-layer chromatography, etc. The major difference between these various chromatographic methods is the physical state of the mobile phase (gas or liquid), and the manner in which the stationary phase is supported (coated on an inert granular material packed in a tube, coated on an inert plate, etc.) In each method the separation mechanism is essentially the same, i.e., distribution of the sample components between a mobile phase and a stationary phase. When the method is used for chemical analysis, a detector is often placed at the other end of the system so as to monitor the passage of the component zones as they emerge from the system. The signal from the detector is displayed on a recording device such as a strip chart recorder, and the record indicates both qualitative and quantitative information regarding the components of the sample.

It is often desirable for a chromatographic system to provide high resolution (a large degree of component separation), evenly spaced component zones, rapid separation, and a satisfactory record from a very small sample. The behavior of the system described in these terms may be called the "performance" or the system. It is well known in the chromatography art to improve system performance by changing one of the following system variables during the course of the analysis: temperature, chemical composition of the mobile phase, and flow rate of the mobile phase. For example, in gas chromatography the temperature of the system is often varied as a preselected function of time. This technique is known as "temperature programming," and it improves the performance of the system, especially with samples containing components which boil over a wide temperature range. Analogous to temperature programming in gas chromatography is the use of "gradient elution" in liquid chromatography. Gradient elution refers to changing the chemical composition of the mobile phase (also called the "eluent" or "eluting solvent") as a continuous preselected function of time, thereby improving the performance of the system, especially with samples containing components which vary widely in chemical properties. A further example of changing the chromatographic variables is the recent development of "flow programming" in gas and liquid chromatography, wherein the flow rate of the mobile phase is changed as a preselected function of time. As mentioned previously, the object of changing or "programming" the individual chromatographic system variables during the analysis is to improve one or more aspects of system performance.

It has been shown that simultaneous programming of more than one system variable can yield superior performance over programming the variables one at a time. For example, in liquid chromatography maximum resolution in the minimum time may sometimes be achieved by simultaneously programming the chemical composition and flow rate of the eluent (mobile phase). Heretofore, the practising chromatographer was limited to a conventional gradient elution apparatus (which varies the chemical composition of the eluent) and a manually varied eluent flow rate. Not only is this arrangement tedious to operate, but it is difficult to obtain reproducible results since it is very difficult to exactly repeat a manual flow program.

The present invention provides a chromatographic system wherein the flow rate and chemical composition of the mobile phase may be simultaneously, independently, and automatically programmed as preselected functions of time. The chromatographic system comprises a plurality of reservoirs containing the mobile phases to be mixed, a chromatographic column, a plurality of flow controllers, and a voltage divider which determines the flow rate and chemical composition of the mobile phase. The voltage applied to the divider determines the total flow rate of the mobile phase, while the voltage ratio across the divider branches determines the mobile phase composition. Programming means are provided for varying both the voltage applied to the divider and the voltage ratio as preselected functions of time, resulting in a corresponding variation of the mobile phase flow rate and composition. Means are also provided for programming the temperature of the mobile phase and the chromatographic column.

The main advantage of the present invention is that it provides an integrated chromatographic system that is far more versatile than conventional chromatographic apparatus. The user, at his option, may automatically program temperature, mobile phase flow rate, and mobile phase composition, either simultaneously or individually. For example, the system can be operated in a gradient elution mode by programming only the mobile phase composition while holding temperature and flow rate constant. Alternatively, temperature and composition may be held constant while flow rate is programmed. Thus, any or all of the system variables may be programmed at will, thereby conferring upon the present apparatus a much greater flexibility than was heretofore available with conventional chromatographic systems. Another advantage of the invention is that the flow, composition and temperature programs are all highly reproducible, a feature which is especially important in preparative chromatographic work.

The invention will be described with reference to the accompanying drawings, in which:

FIGURE 1 is a schematic drawing of the invention adapted for use as a liquid chromatography system;

FIGURE 2 is a schematic drawing of the invention modified for use as a gas chromatography system, and FIGURE 3 is a block diagram of a voltage divider circuit suitable for use with the apparatus of FIGURES 1 and 2.

Referring now to FIGURE 1, there is shown a variable voltage source 11 whose output E is variable as a function of time by a first function generator 12. Voltage E is applied across a variable voltage divider 13 which divides E into two voltages, $E_A$ and $E_B$, such that $E = E_A + E_B$. The divider voltage ratio $E_A/E_B$ is variable as a function of time by a second function generator 14. Voltages $E_A$ and $E_B$ are applied to the inputs of voltage-controlled motors 16 and 17, respectively, which in turn drive pumps 18 and 19. Reservoirs 21 and 22, respectively containing mobile phases A and B, are connected to the inputs of pumps 18 and 19 by conduits 23 and 24. The pump output conduits 26 and 27 join at a mixing union 28 to form a column input conduit 29. A mixture of mobile phases A and B flows through conduit 29, past an injector port 30, and into a chromatographic column 31 packed with a stationary phase 32 (a stationary phase could also be coated on the inside of column 31 in a manner analogous to a "capillary column" as used in gas chromatography). Column 31 is surrounded by a jacket 33 containing a heat-exchange fluid which is circulated by a pump 34. The heat-exchange fluid in jacket 33 is heated (or cooled) by a heater/cooler 36 in response to a control signal from a temperature controller 37. The column eluent, containing solutes dissolved in a mixture of mobile phases A and B, passes through a detector 38 which is responsive to the individual solutes dissolved in the mobile phase. The detector output signal is displayed on a strip chart recorder 39 or similar recording device. After passing through detector 38, the column eluent may be collected by a fraction collector 41.

The total flow rate of mixed mobile phases A and B through conduit 29 is equal to the sum of the individual flow rates in conduits 26 and 27. The individual flow rates in 26 and 27 are equal to the pumping rates of pumps 18 and 19, which, in turn, are proportional to the shaft speeds of motors 16 and 17. Since the motor shaft speeds are proportional to the respective motor input voltage $E_A$ and $E_B$, it follows that the mobile phase flow rate to column 31 is proportional to the sum of $E_A$ and $E_B$. However, as mentioned previously, $E = E_A + E_B$, that is, the sum of the voltage inputs to motors 16 and 17 is equal to the voltage output from voltage source 11. Thus, the flow rate to column 31 of mixed mobile phases A and B is directly proportional to the voltage E. Since E can be varied as a preselected function of time by function generator 12, the flow rate to column 31 can be "programmed" in any desired manner by appropriate adjustment of function generator 12 (which generates a "flow" function as indicated in FIGURE 1).

The composition of the mixed mobile phase flowing through column 31 may be expressed as the ratio of the amount of phase A to phase B in the mixture. Since this ratio is identical to the ratio of the flow rate of phase A to that of phase B, the composition may be expressed as a ratio of flow rates when both rates are measured in similar units such as milliliters per minute. This ratio of flow rates, $F_A/F_B$, is proportional to the shaft speed ratio of motors 16 and 17, and hence is proportional to the voltage ratio $E_A/E_B$. The output signal from function generator 14 determines the voltage divider ratio $E_A/E_B$ at any given time. Thus, the composition of the mobile phase flowing into the column may be "programed" as a preselected function of time in response to the signal from function generator 14 (which generates a "composition" function as indicated in FIGURE 1).

The third major system variable, temperature, may be programmed by means of heater/cooler 36 and temperature controller 37. The design and operation of chromatographic temperature programmers and isothermal controllers is well known in the chromatography field (see, for example, Dal Nogare and Juvet, "Gas-Liquid Chromatography," pages 329–332, Interscience Publishers, 1962).

From the above discussion it can be seen that the present invention provides a completely flexible chromatographic system wherein the operator may automatically vary any or all of the system variables according to a preselected program. For example, the system may be operated as a gradient elution apparatus by setting flow function generator 12 such that voltage source 11 generates a constant output voltage E (hence holding the flow rate to the column via conduit 29 constant), and adjusting composition function generator 14 such that voltage divider 13 varies the voltage ratio $E_A/E_B$ (thus varying the composition of the mobile phase) in a desired manner.

An alternative mode of operation is to maintain a constant mobile phase composition while programming the total flow rate through column 31. This is accomplished by setting composition function generator 14 such that voltage divider 13 maintains the voltage ratio $E_A/E_B$ constant (thus maintaining a constant mobile phase composition), and setting flow function generator 12 such that the voltage source 11 varies the voltage E (thus varying the total flow rate) in a desired manner.

The most versatile mode of operation of the apparatus is one in which both the flow rate and composition of the mobile phase are programmed simultaneously (column temperature can, of course, also be programmed at the same time). In this mode of operation, function generators 12 and 14 are adjusted to generate signals corresponding to the desired rates of change of mobile phase flow rate and composition. The voltage sum $E_A + E_B$ (which determines the mobile phase flow rate), and the voltage ratio $E_A/E_B$ (which determines the mobile phase composition), are thus programmed as independent preselected functions of time in response to the signals generated by function generators 12 and 14.

It should be understood that although FIGURE 1 and the preceding description have been directed toward a liquid chromatography system, the same general apparatus can be adapted for gas chromatography with only minor modifications. FIGURE 2 shows the same basic apparatus as FIGURE 1 with appropriate modifications for use as a gas chromatographic system. Referring to FIGURE 2, there is shown in the basic control circuit of FIGURE 1, comprising variable voltage source 11, function generator 12, variable voltage divider 13, and function generator 14. The divider output voltages $E_A$ and $E_B$ are applied to the respective electrical inputs of electrically-responsive flow metering devices (such as solenoid valves) 42 and 43; the valves being of the type wherein the flow throughput is directly proportional to the voltage applied to the input terminals. Compressed gas sources 44 and 46, together with associated pressure gauges 47 and 48 and pressure regulators 49 and 51, are connected to the fluid inputs of valves 42 and 43 via conduits 52 and 53, respectively. The arrows adjacent conduits 52 and 53 indicate the direction of carrier gas flow into valves 42 and 43. Fluid output conduits 54 and 56 join at a mixing union 57 to form a column input conduit 58 which communicates with the input of a gas chromatographic column 59. The sample to be analyzed is introduced into column 59 via an injection port 61. Column 59 is disposed within an enclosure 62 (commonly called an "oven") wherein the temperature is controlled (held constant or varied as a function of time) by a temperature controller 63 in conjunction with a resistance heater 64 and a blower 66. As in FIGURE 1, the column effluent whose electrical output signal is displayed on a recorder (a gaseous mixture of mobile phases A and B plus dissolved sample components) is detected by a detector 38 39. If required for further analysis, the eluted sample components may be trapped individually in a collector 41.

The operation of the gas chromatography system shown in FIGURE 2 is generally similar to the liquid chromatography system of FIGURE 1. It should be noted, however, that the flow rates of mobile phases A and B in FIGURE 1 are proportional to the angular velocities of motors 16 and 17, whereas the flow rates of carrier gases A and B in FIGURE 2 are proportional to the position (rather than angular velocity) of valves 42 and 43. This difference arises, of course, from the fact that the carrier gases in FIGURE 2 are already under pressure, whereas the mobile phases in FIGURE 1 are pumped up to pressure to overcome the flow resistance of the chromatographic column. The general similarity of operation between the liquid and gas systems is preserved, however, in that both systems provide for the generation of an analog voltage E proportional to the desired total flow rate to the column, and an analog voltage ratio $E_A/E_B$ proportional to the desired mobile phase composition. In the apparatus of FIGURE 1, voltages $E_A$ and $E_B$ are converted to angular velocities of motors and pumps, whereas in the gas chromatography system of FIGURE 2 voltage $E_A$ and $E_B$ are converted to valve positions. It should be understood, of course, that the apparatus of FIGURE 1 could be constructed using pressurized mobile phase reservoirs and flow metering devices, rather than unpressurized reservoirs and pumps as shown in FIGURE 1. Similarly, the apparatus of FIGURE 2 could be constructed using gas reservoirs at atmospheric pressure together with the requisite pumps to overcome the flow resistance of the chromatographic column. The choice of pressurized or unpressurized reservoirs is largely dependent on the particular application of the chromatographic system, the basic principle of operation remains the same; the sum of analog voltages $E_A+E_B$ controls flow metering devices so as to vary the flow rate of the mobile phase, while an analog voltage ratio $E_A/E_B$ controls flow metering devices so as to vary the composition of the mobile phase.

The apparatus of FIGURE 2 can be operated in a number of modes similar to the system shown in FIGURE 1. For example, the total flow rate of carrier gases A and B can be programmed as a preselected function of time by adjusting function generator 12 to provide the desired analog flow voltage E (thus programming carrier gas flow rate), while adjusting function generator 14 to provide a constant voltage ratio $E_A/E_B$ (thus maintaining a constant carrier gas composition). Similarly, total flow rate may be kept constant while carrier gas composition is programmed, a mode of operation exactly analogous to gradient elution in liquid chromatography. If the apparatus were operated in such a "gradient elution" mode, detector 38 could be of the "differential" type in which the detector output signal represents the difference between the signal generated by carrier gas alone, and the signal generated by carrier gas plus dissolved sample components. Such differential operation would eliminate the appearance of spurious peaks and drift on the recorder trace resulting from the changing composition of the carrier gas during the "gradient elution" program. The design and operation of differential detectors in gas chromatography is explained in several standard textbooks (see, for example, Dal Nogare and Juvet, op. cit., page 187–188). Differential detector operation in the liquid chromatography system of FIGURE 1 could also be employed to null out the effect of changing mobile phase composition. Various differential detectors are available for liquid chromatography systems, among which is a detector which measures the difference in refractive index between the mobile phase alone and mobile phase plus dissolved solutes. Such a differential refractometer is commercially available from Waters Associates, Framingham, Massachusetts. Other detetctors which are suitable for use in the liquid chromatography system of FIGURE 1 are those in which the mobile phase is separated from the dissolved solute before entering the detector. Detectors of this type include a continuous conveyor apparatus described in U.S. Patent 3,128,619 issued to Seymour Lieberman, and a modification of this apparatus described by E. Haahti in Journal of Gas Chromatography, January 1966, pages 12–15.

It should be noted that the present apparatus permits the advantages of gradient elution operation to be extended to gas chromatography whereas, heretofore, its use has been limited to liquid chromatography. The provision of a simple apparatus for programming carrier gas composition allows the user to vary the chemical properties of the carrier gas to improve the performance of the chromatographic system. For example, carrier gas A in FIGURE 2 could be pure dry helium, while carrier gas B could be helium saturated with water vapor. By starting the separation using pure dry helium, and gradually increasing the percentage of water-saturated helium, the polarity of the carrier gas could be increased as a preselected function of time. Thus, gradient elution operation in gas chromatography affords a new degree of freedom in the choice of chromatographic variables. Whereas heretofore the gas chromatographer could only change the polarity of the stationary phase to suit the polarity of the sample components, he can now alter the polarity of the carrier gas to achieve maximum resolution in the shortest time (of course, polarity is only one of several properties of the carrier gas that may be altered).

Function generators 12 and 14 may comprise any one of several conventional designs well known in the electrical control art. Linear functions may be generated by sawtooth generators, ramp generators, constant speed motors in combination with linear potentiometers, etc. Some non-linear functions may be generated with a combination of a constant speed motor and a non-linear potentiometer. Exponential functions may easily be generated by charging (or discharging) a capacitor. The most versatile function generators, however, are those in which the user is not limited to a single class of function, but rather may select any arbitrary function of his own choosing. One type of "arbitrary function" generator comprises a plurality of potentiometers connected to a power supply. The user selects an arbitrary function to be generated, and then sets each of the potentiometers to generate a straight line approximation to a portion of the selected function. The more potentiometers there are, the better the approximation to the desired function. This type of function generator is widely used in the analog computer art, where it is used to generate arbitrary test waveforms. Another type of "arbitrary function" generator employs a rotating drum upon which is fixed a paper cutout representing the selected function. As the drum rotates, a photoelectric cell senses the boundary between the drum and the paper cutout, thus providing an output signal whose amplitude is directly proportional to the value of the function at any given time. There are numerous variations on this design, e.g., the function may be drawn with a conductive paint or pencil on a non-conductive background. As mentioned previously, the design of such function generators is well known to those skilled in the electrical control and computation art, and it is not deemed necessary to describe these devices in detail.

Variable voltage source 11 may comprise any one of a number of devices whose output signal is proportional to an analog input signal. A stabilized DC amplifier, e.g., an operational amplifier connected in the voltage feedback mode, provides an excellent variable voltage source whose output voltage is directly proportional to its analog input voltage (furnished by function generator 12). In the event that the output voltage of source 11 is not sufficient to directly drive motors 16 and 17, or valves 42 and 43, an intermediate voltage amplifier may be disposed between source 11 and the motors (or valves) to increase the source output to the required level. A good discussion of DC amplifiers and operational amplifiers is given by Malmstadt et al., in "Electronics for Scientists," pages 341–388, W. A. Benjamin Inc., 1963. FIGURE 8–32 (page 377) of the Malmstadt book shows an operational amplifier voltage source coupled to a power amplifier for boosting the available power output. If this circuit were used as voltage source 11, the analog voltage from function generator 12 would be connected in place of the reference voltage ($e_{ref}$) shown in the circuit schematic. This particular circuit (FIG. 8–32 of the Malmstadt book) is illustrative of an entire class of voltage-regulator devices which are suitable for use as a variable voltage source in the present invention. Such voltage regulators operate by continually comparing their own output voltage against a fixed reference voltage. A difference signal is generated which is fed back so as to make the output voltage approach the reference voltage, i.e., to stabilize the output at the value of the reference voltage. Such regulator devices can easily be adapted to serve as voltage sources in the present apparatus merely by connecting the analog voltage from function generator 12 in place of the fixed reference voltage. In this manner, the circuit will continually strive to match its output voltage to the value of the input analog signal from the function generator. The design of solid-state voltage regulators is given in a publication entitled "Transistorized Voltage Regulators" published by the Radio Corporation of America, Somerville, New Jersey. In addition to the all-electronic voltage sources just described, an electromechanical variable voltage source could comprise a combination of a constant voltage source and a potentiomenter whose voltage tap is controlled by a motor responsive to the analog signal from function generator 12.

Voltage divider 13 may comprise any one of several divider circuits, one of which is shown in FIGURE 3. Referring now to FIGURE 3, there is shown an operational amplifier 67 connected in the voltage follower configuration in which the amplifier output is fed back to the inverting (−) input. The output from function generator 14, designated $e_f$, is applied to the non-inverting (+) input of amplifier 67 such that the amplifier output to terminal 68 is virtually equal to $e_f$. The output voltage E from source 11 is applied between terminals 69 and 71 (terminal 71 is the reference point from which all circuit voltages are measured). Connection 15, between function generator 14 and the "high side" of voltage source 11, ensures that the value of $e_f$ is always less than (or at most equal to) the value of E. In the operation of the divider circuit, input voltage $e_f$ causes the potential of terminal 68 to move up or down between the limiting potentials of terminals 69 and 71. In this way the ratio $E_A/E_B$ is varied in response to the input voltage ($e_f$) from function generator 14, while at the same time the condition $E=E_A+E_B$ is fulfilled. Even when E is varied as a function of time, as in a programmed flow rate experiment, the sum of $E_A$ and $E_B$ will always equal the instantaneous value of E. As shown in FIGURE 3, voltages $E_A$ and $E_B$ may be applied directly to the input terminals of motors 16 and 17 or valves 42 and 43. The circuit shown in FIGURE 3 is merely intended to illustrate the manner in which the ratio of two voltages may be changed while maintaining their sum equal to a given value at any instant of time. There are several other electronic circuits which will perform the same function, and these are well known to those skilled in the electronic art.

In addition to all-electronic divider circuits, an electromechanical equivalent can be constructed by applying the voltage E across the fixed terminals of a potentiometer and connecting the potentiometer's center tap to a motor which is responsive to the analog signal from function generator 14. The operation of this electromechanical apparatus is exactly analogous to the operational amplifier circuit of FIGURE 3, i.e., the ratio of $E_A$ to $E_B$ (measured between the respective fixed terminals and the center tap of the potentiometer) is continuously changed in response to an analog input signal while maintaining the sum of $E_A$ and $E_B$ equal to E at any instant of time.

It is important that the shaft speeds of motors 16 and 17 be directly proportional to the respective input voltages $E_A$ and $E_B$. There are various methods of insuring linearity between motor r.p.m. and input voltage, as is well known in the servo motor control art. Another method of insuring linearity between shaft speed and input voltage is to use stepper motors rather than motors which rotate continuously. A suitable circuit for use with a stepper motor could include a linear voltage-to-frequency converter whose input is supplied by $E_A$ or $E_B$ from the voltage divider. The output of the converter could be applied to a flip-flop (bistable multivibrator) or other suitable pulse generator, and the resulting pulse train would directly drive the stepper motor. The advantage of such a motor drive is that the shaft speed of the stepper motor is always directly proportional to the input pulse frequency, and hence to the input voltage ($E_A$ or $E_B$) to the voltage-to-frequency converter.

Pumps 18 and 19 may comprise any fluid displacement or metering apparatus wherein the output flow rate is directly proportional to the magnitude of an input signal (such as a shaft speed, a translational displacement of a piston, etc.). For operation at high back pressures, e.g., a tightly packed column using small diameter particles, it is desirable that the pump be of the positive displacement type. Various single and double-acting piston pumps are commercially available which are suitable for use in the present apparatus. Conventional syringes may also be employed as positive displacement pumps when provided with the requisite gearing and associated drive mechanism for advancing the syringe pistons at different velocities (to provide for programmed composition and flow rate). Such syringe pumps are commonly used as fluid metering devices and are easily adaptable for use in the present apparatus.

Although the invention has been described with reference to only two control signals, $E_A$ and $E_B$, the basic control concept of the invention can be extended to provide any desired number of control signals. For example, signals $E_A$ and $E_B$ could each be connected to the input of a separate divider circuit so as to produce four control signals, $E_C$, $E_D$, $E_E$, and $E_F$. Each of these four signals could then control the flow from a separate mobile phase reservoir, thereby resulting in a chromatographic system wherein four distinct mobile phases could be independently programmed. For example, both the pH and ionic strength of the combined mobile phase could be independently programmed.

While the various electrical signals involved in the operation of the apparatus of FIGURES 1, 2, and 3 have been consistently referred to as voltage signals, it will be apparent to those skilled in the electrical control art that such electrical signals could perform the same control functions if they were present as currents, frequencies, phase differences, etc. The use of voltage-generating and voltage-responsive apparatus in the previous description is merely intended to be illustrative of one embodiment of the invention. Accordingly, the voltage E, which determines the total flow rate, may be denoted as a generalized primary control signal $P_c$. Similarly, the divider voltages, $E_A$, $E_B$, $E_C$ . . . $E_n$, which determine the composition of the mixed mobile phase, may be denoted as generalized secondary control signals $S_1, S_2, S_3 \ldots S_n$. In addition, although the preceding description has implied a control system using analog signals, it will be apparent to those skilled in the electrical control art that the same control functions could be performed using digital signals. For example, the output signals from function generators 12 and 14 could be digital representations of selected flow and composition programs, rather than analog voltage representations.

While several embodiments of the invention have been shown and described, these are merely intended to be illustrative, and various modifications may be made in the apparatus described herein without departing from the scope of the invention as defined in the following claims.

What is claimed is:

1. A chromatographic system for separating and detecting components of a sample, comprising in combination,
    (a) chromatographic separation means containing a stationary phase,
    (b) a plurality of reservoirs each containing a mobile phase,
    (c) a plurality of conduits defining a flow path for said mobile phases between said reservoirs and said separation means,
    (d) flow control means adapted to control the flow rate of said mobile phases,
    (e) means for generating a primary control signal whose value is variable in response to an input signal,
    (f) primary function generator means for generating a desired first input signal to said primary control means so as to vary the value of said primary control signal in a desired manner,
    (g) means for producing a plurality of secondary control signals from said primary control signal, the values of said secondary control signals being variable in response to an input signal, said secondary control signals controlling said flow control means,
    (h) secondary function generator means for generating a desired second input signal to said secondary control signal production means so as to vary the values of said secondary control signals in a desired manner,
    (i) and means for detecting said separated sample components.

2. The apparatus according to claim 1, wherein said mobile phases are liquids.

3. The apparatus according to claim 1, wherein said mobile phases are gases.

4. The apparatus according to claim 1, wherein said chromatographic separation means comprises a tubular column packed with a stationary phase.

5. The apparatus according to claim 1, wherein said chromatographic separation means comprises a tubular column having a stationary phase coated as a layer on the inner wall surface of the tube.

6. The apparatus according to claim 1, wherein said mobile phases are liquids and said flow control means are pumps.

7. The apparatus according to claim 1, wherein said mobile phases are liquids stored under pressure within said reservoirs and said flow control means are valves.

8. The apparatus according to claim 1, wherein said mobile phases are gases stored under pressure within said reservoirs and said flow control means are valves.

9. The apparatus according to claim 1, wherein said primary control signal is a variable voltage.

10. The apparatus according to claim 1, wherein said primary control signal is a variable current.

11. The apparatus according to claim 1, wherein said primary control signal is a variable frequency.

12. The apparatus according to claim 1, wherein said secondary control signals are variable voltages.

13. The apparatus according to claim 1, wherein said secondary control signals are variable currents.

14. The apparatus according to claim 1, wherein said secondary control signals are variable frequencies.

15. The apparatus according to claim 1, including means for varying the temperature of said chromatographic separation means as a preselected function of time.

16. The apparatus according to claim 1, including means for collecting the separated components of said sample.

17. Fluid metering apparatus for varying the flow rate and chemical composition of fluid mixtures, comprising in combination,
    (a) a plurality of flow control means for controlling a plurality of fluid streams having individual flow rates $F_1, F_2, F_3 \ldots F_n$, each of said streams consisting of at least one chemical component,
    (b) means for mixing said fluid streams so as to form a mixed fluid stream having a flow rate equal to the sum, $F_{sum}$, of said individual flow rates $F_1, F_2, F_3 \ldots F_n$ and a composition consisting of a mixture of said chemical components,
    (c) means for generating a primary control signal $P_c$ whose value is variable in response to a primary input signal $P_i$,
    (d) primray function generator means for supplying a desired input signal $P_i$ to said primary control signal generating means so as to vary the value of $P_c$ in accordance with the variations in $P_i$,
    (e) means for producing a plurality of secondary control signals $S_1, S_2, S_3 \ldots S_n$ from said primary control signal $P_c$ such that the sum, $S_{sum}$, of said secondary control signals is equal to the value of $P_c$ at any given time, and the ratios $S_1/S_{sum}, S_2/S_{sum}, S_3/S_{sum} \ldots S_n/S_{sum}$ are variable in response to a secondary input signal $S_i$,
    (f) secondary function generator means for supplying a desired input signal $S_i$ to said secondary control signal production means so as to vary the ratios $S_1/_{sum}, S_2/S_{sum}, S_3/S_{sum} \ldots S_n/_{sum}$ in response to the variations in $S_i$, and
    (g) means for connecting said secondary control signals $S_1, S_2, S_3 \ldots S_n$ to said flow control means such that $F_{sum}$ is proportional to $S_{sum}$ and the chemical composition of said mixed fluid stream is proportional to the ratios $S_1/S_{sum}, S_2/S_{sum}, S_3/S_{sum} \ldots S_n/S_{sum}$.

18. A method for varying the flow rate and chemical composition of fluid mixture, comprising the steps, of,
    (a) generating an electrical signal $P_c$, whose value at any given time is proportional to a desired flow rate, $F_{sum}$, of a mixed fluid stream,
    (b) dividing signal $P_c$ into a plurality of secondary signals, $S_1, S_2, S_3 \ldots S_n$, such that the sum $S_{sum}$, of said secondary signals is equal to the value of $P_c$ at any given time,
    (c) applying said secondary signals $S_1, S_2, S_3 \ldots S_n$ to a plurality of fluid flow controllers to produce a plurality of individual fluid streams having respective flow rates $F_1, F_2, F_3 \ldots F_n$,
    (d) mixing said individual fluid streams to produce a mixed fluid stream having a flow rate $F_{sum}$, and
    (e) varying the ratios $S_1/S_{sum}, S_2/S_{sum}, S_3/S_{sum} \ldots S_n/S_{sum}$ to produce corresponding variations in the ratios $F_1/F_{sum}, F_2/F_{sum}, F_3/F_{sum} \ldots F_n/F_{sum}$, thereby causing the chemical composition of said mixed fluid stream to vary in a desired manner.

19. The method according to claim 18, including the step of flowing said mixed fluid stream through a chromatographic separation means to separate the components of a sample mixture introduced into said separation means.

(References on following page)

References Cited

UNITED STATES PATENTS

| | | | |
|---|---|---|---|
| 2,778,799 | 1/1957 | Lindsay | 137—624.11 |
| 3,089,643 | 5/1963 | Schotanus et al. | 235—151 |
| 3,270,812 | 9/1966 | Gilchrist et al. | 166—9 |
| 3,373,872 | 3/1968 | Hrdina | 210—198 |

JAMES J. GILL, *Primary Examiner.*

VICTOR J. TOTH, *Assistant Examiner.*

U.S. Cl. X.R.

73—61.1; 210—31